(12) United States Patent
Morrison et al.

(10) Patent No.: US 10,332,702 B2
(45) Date of Patent: *Jun. 25, 2019

(54) USING ORGANIC LIGHT EMITTING DIODE (OLED) FILM TO ILLUMINATE KEYCAPS OF KEYS IN A KEYBOARD

(71) Applicant: Dell Products L. P., Round Rock, TX (US)

(72) Inventors: John Trevor Morrison, Round Rock, TX (US); Kevin M. Turchin, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,674

(22) Filed: Dec. 26, 2018

(65) Prior Publication Data

US 2019/0131089 A1     May 2, 2019

Related U.S. Application Data

(63) Continuation of application No. 15/583,048, filed on May 1, 2017, now Pat. No. 10,204,753.

(51) Int. Cl.
| | |
|---|---|
| *H01H 13/72* | (2006.01) |
| *H01H 13/76* | (2006.01) |
| *H01H 13/83* | (2006.01) |
| *G06F 1/16* | (2006.01) |
| *H01H 3/12* | (2006.01) |

(52) U.S. Cl.
CPC ........... *H01H 13/83* (2013.01); *G06F 1/1637* (2013.01); *G06F 1/1662* (2013.01); *G06F 1/1681* (2013.01); *H01H 3/125* (2013.01); *H01H 2219/037* (2013.01)

(58) Field of Classification Search
CPC .... G06F 1/1637; G06F 1/1662; G06F 1/1681; H01H 13/83; H01H 2219/037; H01H 3/125
USPC ................. 200/5 A, 600, 402, 405, 406, 408
See application file for complete search history.

(56) References Cited

U.S. PATENT DOCUMENTS

2007/0102266 A1* 5/2007 Wingett ............... H01H 25/041
                                                                   200/5 A

* cited by examiner

*Primary Examiner* — Anthony R Jimenez
(74) *Attorney, Agent, or Firm* — Campbell Stephenson LLP; Shiv S. Naimpally

(57) ABSTRACT

In some examples, a housing may include a keyboard having a plurality of keys. An individual key of the plurality of keys may include a keycap, an organic light emitting diode (OLED) film (or sheet), a key mechanism, and a base. When power is provided to contacts on the base of the individual key, the power may travel across conductive traces (or wires) in the key mechanism to pads on the OLED film, causing the OLED film to emit light. The light from the OLED film may illuminate a character or symbol embedded into the keycap or the OLED film may be shaped into the character or the symbol and embedded into the keycap. The housing may be (i) separate from and communicatively coupled to a second housing that includes one or more processors or (ii) physically attached to a display device as part of a laptop device.

20 Claims, 8 Drawing Sheets

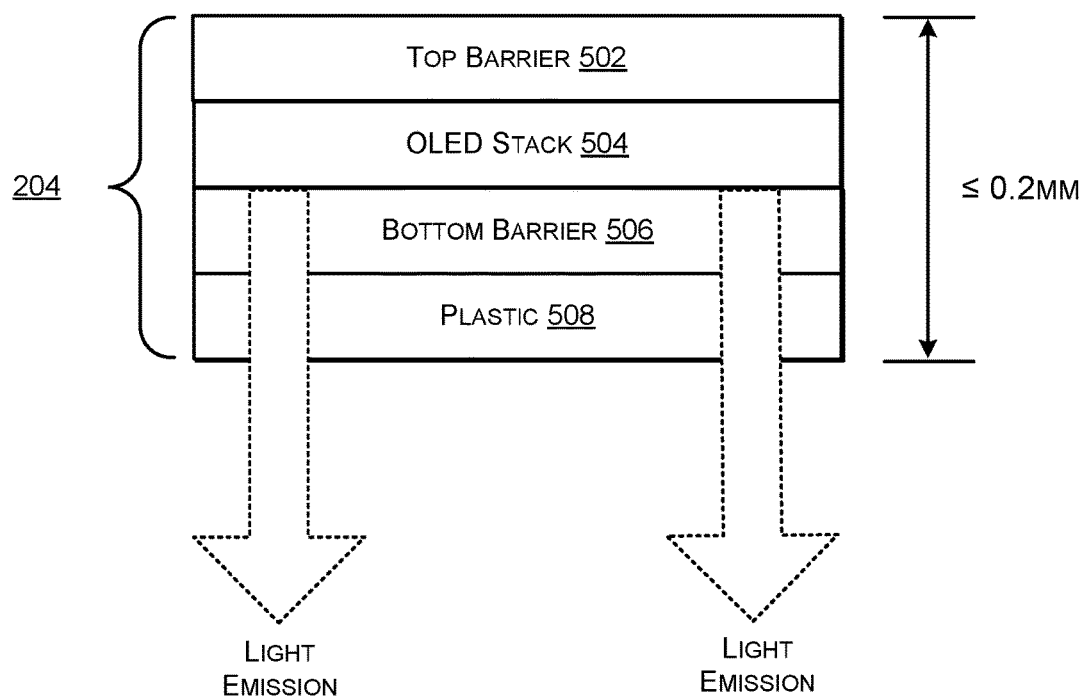

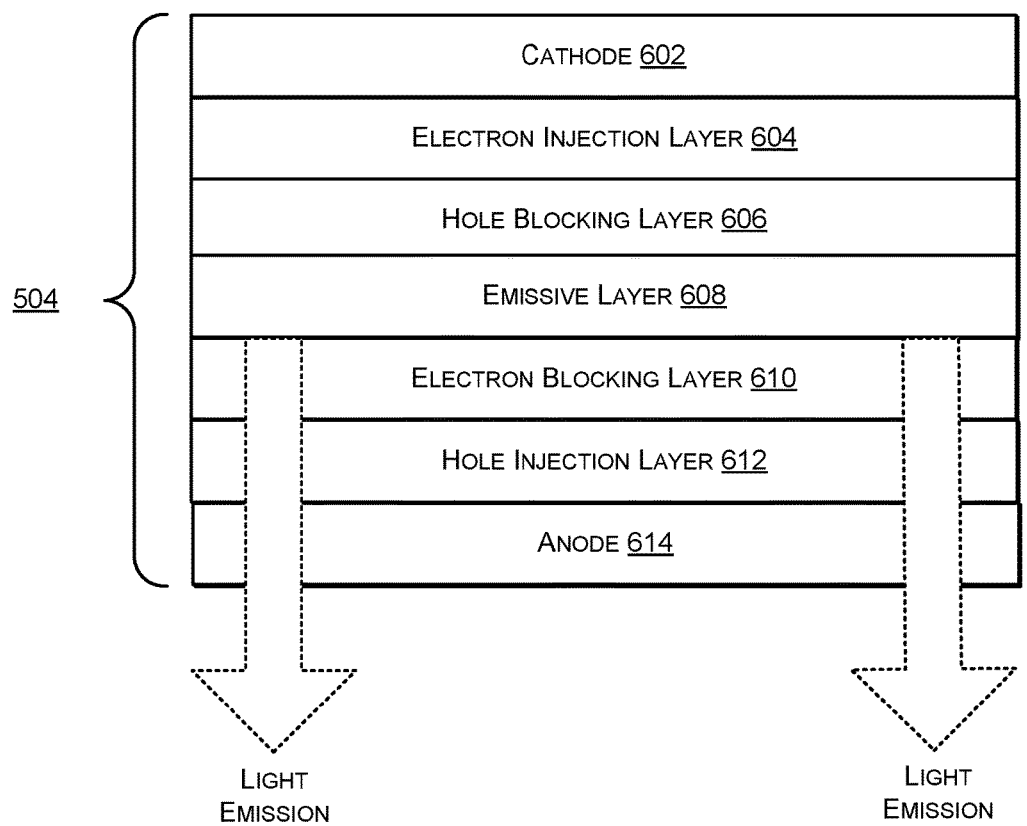

USING ORGANIC LIGHT EMITTING DIODE (OLED) FILM TO ILLUMINATE KEYCAPS OF KEYS IN A KEYBOARD

CROSS-REFERENCE TO RELATED APPLICATIONS

The present patent application is a continuation of U.S. patent application Ser. No. 15/583,048 filed on May 1, 2017 entitled "Using Organic Light Emitting Diode (OLED) Film to Illuminate Keycaps of Keys in a Keyboard" and is incorporated by reference herein in its entirety and for all purposes as if completely and fully set forth herein.

BACKGROUND OF THE INVENTION

Field of the Invention

This invention relates generally to computing devices having a keyboard and, more particularly, to using an organic light emitting diode (OLED) panel in each key to illuminate each keycap.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computer keyboard (e.g., QWERTY-based or similar keyboard) may be used to provide input to a computing device. For example, a keyboard may be integrated into a computing device, such as a laptop, tablet, phone, or other portable computing device. As another example, a stand-alone keyboard may be used to provide input to a desktop computing device, a tablet computing device, or other computing device that does not include an integrated computing device. Many keyboards provide illuminated keyboards to enable users to view the keys in poorly lit environments. However, achieving relatively uniform illumination of each keycap of the keyboard may be challenging for a variety of reasons.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a housing may include a keyboard having a plurality of keys. An individual key of the plurality of keys may include a keycap, an organic light emitting diode (OLED) film (or sheet), a key mechanism, and a base. When power is provided to contacts on the base of the individual key, the power may travel across conductive traces (or wires) in the key mechanism to pads on the OLED film, causing the OLED film to emit light. The light from the OLED film may illuminate a character or symbol embedded into the keycap or the OLED film may be shaped into the character or the symbol and embedded into the keycap. The housing may be (i) separate from and communicatively coupled to a second housing that includes one or more processors or (ii) physically attached to a display device as part of a laptop device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 5 is a block diagram illustrating an OLED sheet according to some embodiments.

FIG. 6 is a block diagram illustrating layers of an OLED stack according to some embodiments.

DETAILED DESCRIPTION

Figure 1:
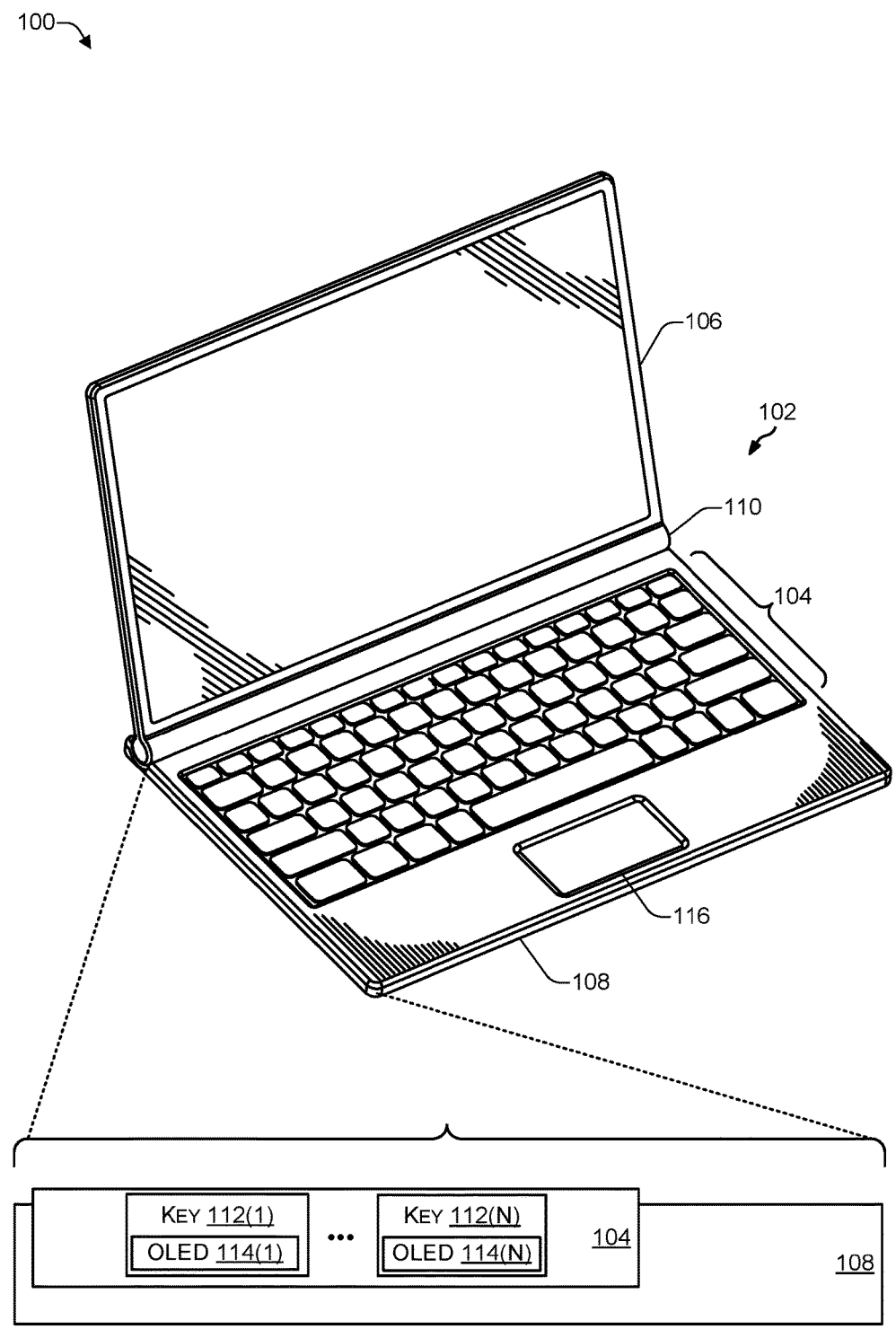
FIG. 1 is a block diagram of an architecture of a computing device that includes an illuminated keyboard according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may use an organic light emitting diode (OLED) panel in each key of a keyboard to provide illumination (e.g., light) under the keycap of each key. Each key may include a scissor mechanism to hold the keycap above a base plate and a dome (e.g., rubber or metal dome) within the scissor mechanism. When the user applies more than a predetermined amount of pressure to the keycap, the scissor mechanism may decrease in height and contact the base plate, causing a key press associated with that particular key to be registered. The OLED sheet (or film) may be placed below the keycap (e.g., above the scissor mechanism). To provide power to the OLED sheet (or film) in each key, metal traces may be placed on the outside (or inside) of the dome. Power applied on a base of each key may travel up the metal traces on the dome to provide power to the OLED sheet (or film) below each keycap of each key.

The keyboard may be housed in a keyboard housing. In a desktop computing device, the keyboard housing may be separate from a second housing used to house a computer motherboard, a display device, other computer component, or any combination thereof. In a laptop computing device, the keyboard housing may be attached (e.g., by hinges or another mechanism) to a second housing used to house the computer motherboard, a display device, other computer component, or any combination thereof. To illuminate a keycap of individual keys, an OLED sheet (or film) may be placed in each key, e.g., just below each keycap.

In contrast, in a conventional lighted keyboard, a light source (e.g., a strip of LEDs) may be placed at one end of the keyboard housing to shoot light horizontally across the bottom of the keyboard housing, with diffraction elements in the keyboard housing used to reflect light up (e.g., vertically) towards the keycaps. Thus, in a conventional lighted keyboard, light may travel horizontally, be reflected vertically and, for each key, pass through the base plate, the scissor mechanism, the dome, to illuminate a bottom of the keycap. The lighting mechanism in a conventional lighted keyboard is therefore inefficient because such a mechanism results in significant light loss. Inefficient lighting means a conventional lighted keyboard consumes more power. Furthermore, because the light source is at one end of the keyboard housing, light is not uniformly distributed among the keycaps.

By using relatively small (e.g., at least approximately 1 centimeter (cm) by 1 cm) OLED sheets underneath each keycap of a keyboard, several benefits are realized. First, because light is provided where needed, with little or no light loss, OLED sheets are much more efficient as compared to a conventional lighted keyboard. Second, because there is very little light loss, lighting the keycaps using OLED sheets consumes less power (e.g., resulting in improved battery life for laptops). For example, a conventional illuminated keyboard may consume one watt of power while a keyboard using OLED sheets to light the keycaps may use at least 50% less power as compared to a conventional illuminated keyboard. Third, the keyboard may be made smaller in height because the light source and diffraction elements are not needed and therefore are removed from the keyboard housing. Typically, the primary factor limiting how thin a laptop can be manufactured is the depth of the keyboard. Using OLED sheets enables the height of the keyboard to be reduced, thereby reducing the thickness of portable computing devices such as laptops. Fourth, each keycap may receive approximately the same amount of light, improving uniformity and reducing (or eliminating) hotspots. Thus, using OLED sheets may result in less significantly light loss, significantly (e.g., at least 50%) less energy consumption, more uniformly lit keys, and a thinner keyboard.

In a first example, a computing device may include a first housing to house a first set of components and a second housing to house a second set of components. For example, the second set of components may include a keyboard having a plurality of keys. Each key of the plurality of keys may include a corresponding keycap, OLED sheet (or film), key mechanism (e.g., dome), and base. The OLED sheet (or film) may include a first pad and a second pad to receive power. A first and second conductive trace may run from a top of the key mechanism (e.g., dome) to a bottom of the key mechanism. The first and second electrical contacts on the base may touch the first and second conductive traces, respectively. When power (e.g., from a power source) is applied to the first and second electrical contacts on the base, the power flows across the first and second conductive traces to the first and second pad of the OLED sheet (or film), causing the OLED sheet (or film) to emit light. The OLED sheet (or film) may be 0.2 millimeters or less in thickness, and about 1 cm (length) by about 1 cm (width). In some cases, the OLED sheet (or film) may be shaped like a character or a symbol and embedded into the keycap. In other cases, a character or a symbol may be embedded into the keycap using a material (e.g., plastic, glass, or other transparent or translucent material) through which light from the OLED sheet (or film) passes.

In a second example, a computing device may include a first housing with a first set of components and a second housing with a second set of components. For example, the second set of components may include a keyboard having a plurality of keys. Each individual key of the keyboard may include an OLED sheet (or film) below each corresponding keycap. Applying power to the OLED sheet (or film) causes the OLED sheet (or film) to emit light. When the computing device is a laptop device, the first housing is connected to the second housing by one or more hinges. When the computing device is a 2-in-1 device, an attachment mechanism enables the first housing to be connected to the second housing for use as a laptop device and enables the first housing to be detached from the second housing to enable the first housing to be used as a tablet computing device. When the computing device is a desktop device, the first housing is separate from the second housing. Applying power from a power source to electrical contacts on a base of each individual key may cause the power to flow across conductive traces on at least a portion of a key mechanism (e.g., dome, scissor, or other mechanism) to electrical pads on the OLED sheet (or film), causing the OLED sheet (or film) to emit light. In some cases, the OLED sheet (or film) may have a shape of a character or a symbol found on a computer keyboard and may be embedded into the keycap. In other cases, the keycap may have embedded material in the shape of a character or symbol. The embedded material may transmit the light emitted by the OLED sheet (or film). The OLED sheet (or film) may include an emissive layer of organic material between a cathode and an anode.

In a third example, a computing device may include a first housing with a first set of components and a second housing with a second set of components. The second set of components may include a keyboard having a plurality of keys. An individual key of the keyboard may include (i) a keycap, (ii) an embedded character or symbol in the keycap, an OLED sheet (or film), and a base. The computing device may have an associated power supply to provide power to the base of each individual key of the keyboard. Applying power to the base of an individual key causes the power to travel from the base, through a key mechanism, to the OLED sheet (or film). For example, the power may travel from the base to the OLED sheet (or film) via conductive traces placed in or on the key mechanism (e.g., dome) of the individual key. An individual key of the keyboard may include at least one of a scissor mechanism or a dome (e.g., made of metal or rubber). In some cases, the OLED sheet (or film) may be embedded in the keycap in the form of a character or a symbol. In other cases, an embedded symbol made of a material that transmits light (e.g., emitted by the OLED) may be embedded into the keycap.

FIG. 1 is a block diagram of an architecture 100 of a computing device 102 that includes an illuminated keyboard 104 according to some embodiments. The computing device 102 may include two housings, such as a first housing 106 and a second housing 108. The first housing 106 may house a display device. The second housing 108 may house the keyboard 104. When the computing device 102 comprises a laptop device, the first housing 106 may be connected to the second housing 108 by a mechanism 110 (e.g., one or more hinges). When the computing device 102 comprises a 2-in-1 device, the mechanism 110 may enable (i) the first housing 106 to be temporarily connected to the second housing 108 for use as a laptop device and (ii) the first housing 106 to be detached from the second housing 108 to enable the first housing 106 to be used as a tablet computing device. When the computing device 102 comprises a desktop device, the first housing 106 may be separate from the second housing 108 (e.g., the mechanism 118 may not be present). The keyboard 104 may include alphanumeric characters and symbols from one or more languages.

To illuminate the keys of the keyboard 104, each key 112 of the keyboard 104 may include an organic light emitting diode (OLED) panel 114. For example, the keyboard 104 may include N keys, e.g., keys 112(1) to 112(N) (N>0, typically N>80). Each of the keys 112(1) to 112(N) may include a corresponding OLED sheet 114(1) to 114(N). Of course, the keyboard 104 may include a means, such as a switch, to turn on the OLED sheets 114(1) to 114(N) when the user desires that the keys of the keyboard 104 be illuminated and to turn off the OLED sheets 114(1) to 114(N) when the user desires that they keys 112 of the keyboard 104 not be illuminated. The second housing 108 may include additional input devices, such as a touchpad 116.

Thus, multiple OLED sheets may be located under those keycaps in a keyboard that are to be illuminated. By using relatively small (e.g., at least approximately 1 centimeter (cm) by 1 cm) OLED sheets underneath each keycap of a keyboard, several benefits are realized. Light is provided where needed, with little or no light loss. Lighting the keycaps using OLED sheets may consume less power (e.g., resulting in improved battery life for laptops) because there is very little light loss. For example, a keyboard using OLED sheets to light the keycaps may use at least 50% less power as compared to a conventional illuminated keyboard. The keyboard housing may be made thinner (e.g., smaller in height) because the light source and diffraction elements used in a conventional illuminated keyboard are not used and may therefore be removed from the keyboard housing. Reducing the height of the keyboard may reduce the thickness of portable computing devices, such as laptops and 2-in-1 computing devices. Using an OLED sheet under individual keycaps of the keyboard provides more uniform lighting of keys, thereby reducing (or eliminating) hotspots. Thus, using OLED sheets to illuminate keycaps of keys in a keyboard may result in less significantly light loss, significantly (e.g., at least 50%) less energy consumption, more uniformly lit keys, and a thinner keyboard.

Figure 2:
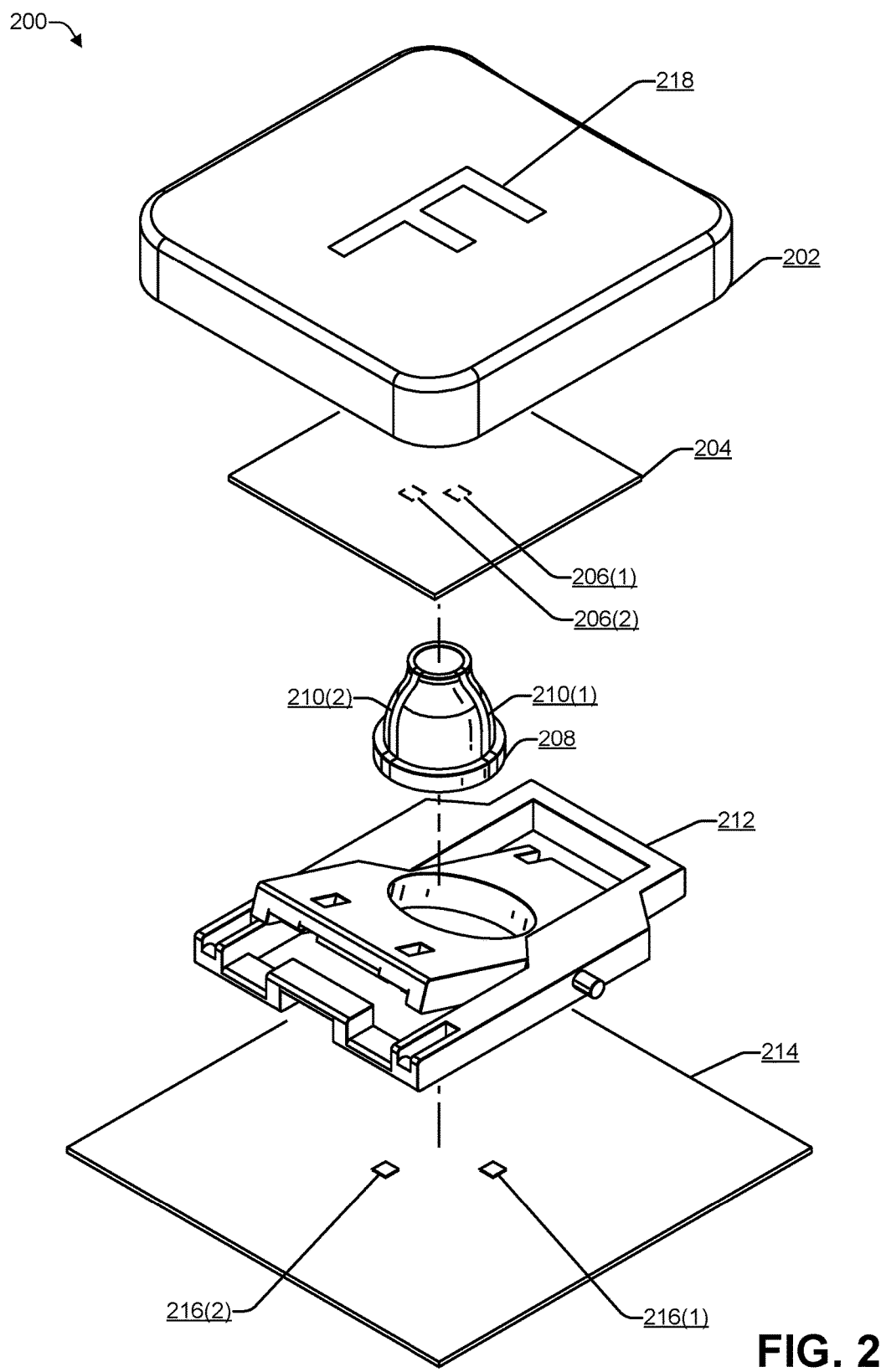
FIG. 2 is a first block diagram illustrating an OLED sheet in a key of a keyboard to illuminate a keycap of the key according to some embodiments.

FIG. 2 is a first block diagram illustrating an OLED sheet in a key 200 of a keyboard to illuminate a keycap of the key according to some embodiments. For example, the key 200 may be a representative one of the keys 112(1) to 112(N) of FIG. 1.

The key 200 includes a keycap 202. An OLED sheet 204 is positioned below the keycap 202. The OLED sheet 204 may be a printed OLED sheet that is inserted between the keycap 202 and a key mechanism, such as the representative key mechanism illustrated in FIG. 2. While FIG. 2 illustrates a dome-type key mechanism, the OLED sheet 204 may be inserted below the keycaps of other types of key mechanisms. The OLED sheet 204 may be thin (e.g., <0.2 millimeters (mm)) and approximately 1 centimeter (cm)×1 cm for regular keys and approximately 1 cm×1.5 cm for larger keys (e.g., ENTER key, SHIFT key, and the like). The term approximate means that the keys may be up to 20% larger or up to 20% smaller than 1×1 cm or 1×1.5 cm. The OLED sheet 204 does not interfere with the operation of the key mechanism. The shape of the OLED sheet 204 may be optimized for each keycap of the keyboard. The OLED sheet 204 may include two contact pads 206(1) and 206(2) to provide power to an anode and a cathode of the OLED. For example, as illustrated in FIG. 2, the two contact pads 206(1) and 206(2) may be located on the bottom of the OLED sheet 204.

The representative key mechanism 200 may include a dome 208 made of a material such as rubber, metal, plastic, another material, or any combination thereof. While a dome-switch key mechanism is illustrated in FIG. 2, the OLED sheet 204 may be used under the keycap 202 of any other type of key mechanism, such as a spring-based key mechanism (e.g., Cherry MX, Romer-G, or the like), capacitive, scissor-switch (also illustrated in FIG. 2), mechanical-switch, buckling-spring, hall-effect, optical, laser, or the like. Electrical traces 210 (e.g., 210(1) for the anode and 210(2) for the cathode) may be injection molded in or printed on the dome 208 to carry power to the OLED sheet 204. The electrical traces 210 may be located outside the dome 208, inside the dome 208, or partly outside and partly inside.

The dome 208 may run through a hole in a scissor mechanism 212. The scissor mechanism 212 and/or the dome 208 may hold the keycap 202 above a base 214. The scissor mechanism 212 may include two pieces that are capable of rotating along a hinge relative to each other, similar to a pair of scissors. When a user applies pressure to the keycap 202, (i) the arms of the scissor mechanism 212 may rotate, causing the keycap 202 to decrease the distance between the dome 208 and the base 214, and/or (ii) the dome 208 may compress, causing the keycap 202 to decrease the distance between the dome 208 and the base 214. When the distance between the dome 208 and the base 214 is less than a predetermined amount, the keyboard may register a keypress of the key 200.

The base 214 may include two contacts 216(1) and 216(2) where power (e.g., direct current (DC)) is applied. The power may travel from the contacts 216, along the traces 210, to the pads 206 of the OLED sheet 204. One of the contacts 216 may connect to a cathode of the OLED sheet 204 and another of the contacts 216 may connect to an anode of the OLED sheet 204.

The keycap 202 may include an illustration 218, such as an alphanumeric character or a symbol, that is embedded into the keycap 202. For example, in some cases, the keycap 202 may be made of a material (e.g., plastic, glass, or the like) that is dark and relatively opaque (e.g., little or no light pass through). In this example, the illustration 218 embedded into the keycap 202 may be made of a material that enables at least a portion of the light from the OLED sheet 204 to be transmitted, enabling a user to discern the illustration 218 in a dimly lit environment. The illustration 218 embedded into the keycap 202 may be made of a transparent or a translucent material (e.g., plastic, glass, or the like). The shape of the OLED sheet 204 may be optimized for each keycap of the keyboard. For example, if the illustration 218 occupies a relatively small amount of the top area of the keycap 202, the OLED sheet 204 may be shaped accordingly. To illustrate, a narrow rectangular shape may be used for the OLED sheet 204 under illustrations such as the character "I", the number "1", the symbol "!", and the like. A semi-circular shape may be used for the OLED sheet 204 under illustrations such as the character "C", the parenthetical symbol "(", and the like. In some cases, the illustration 218 may comprise the OLED sheet 204. For example, the OLED sheet 204 may be embedded into the keycap 202 in the shape of the illustration 218 and may include the electrical pads 206. Thus, in some cases, the illustration 218 may be made from a material that transmits the light emitted by the OLED sheet 204 while in other cases, the illustration 218 may be made using the OLED sheet 204 that has been shaped in the form of a character or a symbol. Some keyboards may use a combination, e.g., a portion of the keys may use OLED material embedded into the keycap 202 in the form of the illustration 218, and a remainder of the keys may use the OLED sheet 204 under the keycap while the illustration 218 that is embedded into the keycap 202 may be made of a transparent or a translucent material that transmits the light emitted by the OLED sheet 204.

Thus, an OLED sheet (e.g., panel) may located below the keycap of each key in a keyboard. The organic layers of the OLED sheet may be deposited or printed (e.g., using inkjet printing or other printing technology). The keyboard may use any type of mechanism (e.g., mechanical, capacitive, or the like) to register a key press. Power may be provided to the OLED sheet by running conductive (e.g., metal) traces inside and/or outside the components of each key mechanism. For example, when a dome-style mechanism is used, the conductive traces may run inside or outside the dome. Of course, other techniques, such as running two wires from the base to the OLED sheet, may be used to provide power.

Figure 3:
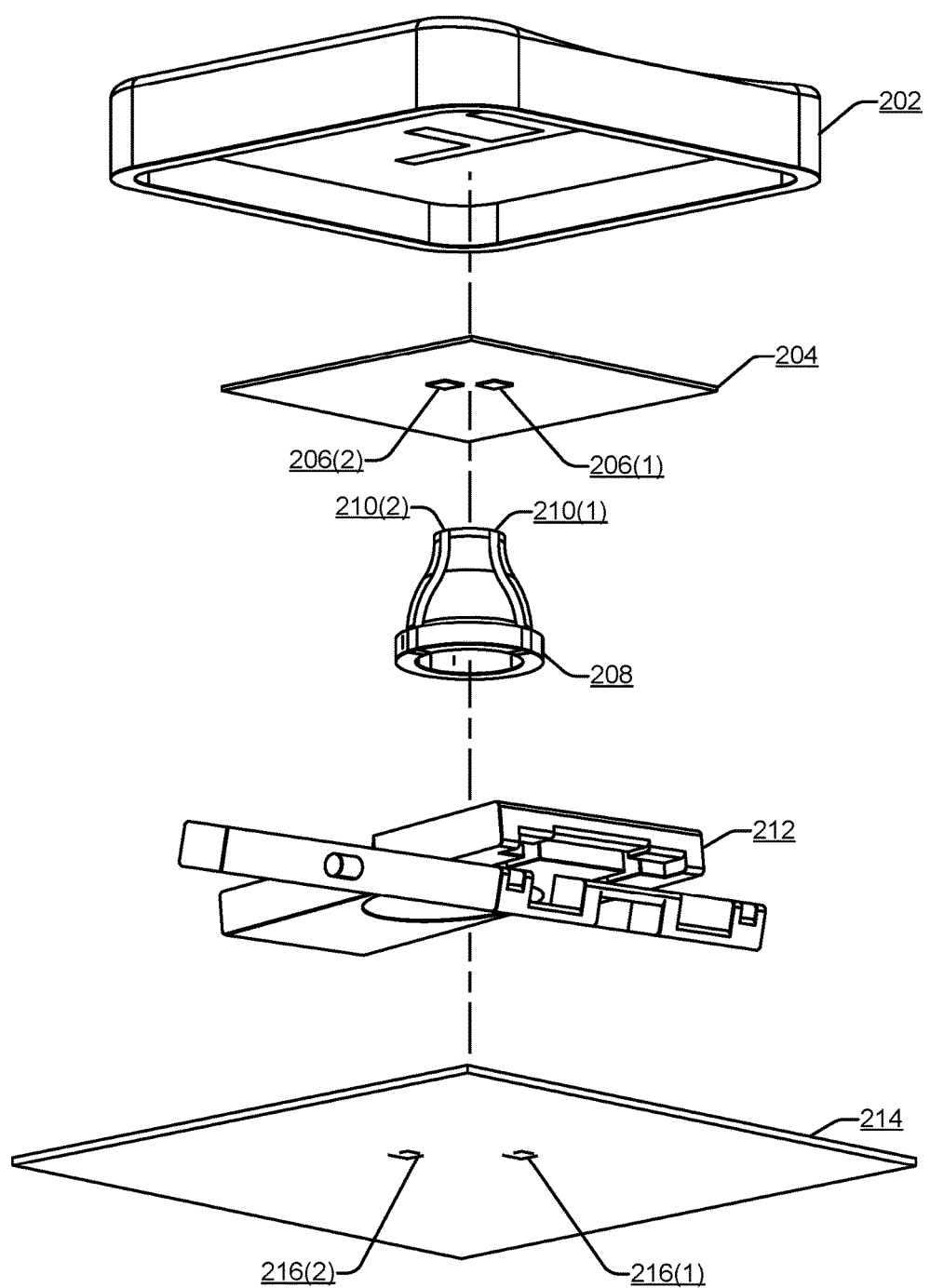
FIG. 3 is a second block diagram illustrating an OLED sheet in a key of a keyboard to illuminate a keycap of the key according to some embodiments.

FIG. 3 is a second block diagram illustrating an OLED sheet in a key of a keyboard to illuminate a keycap of the key according to some embodiments. FIG. 3 illustrates a different perspective of the key mechanism (e.g., one of the keys 112(1) to 112(N) of FIG. 1) illustrated in FIG. 2.

The key mechanism includes the OLED sheet 204 which is positioned below the keycap 202. The OLED sheet 204 may be a printed OLED sheet that is inserted between the keycap 202 and a key mechanism, such as the representative key mechanism illustrated in FIG. 3. While a dome-type key mechanism, the OLED sheet 204 may be inserted below the keycaps of other types of key mechanisms. The OLED sheet 204 may be thin (e.g., <0.2 millimeters (mm)) and approximately 1 centimeter (cm)×1 cm for regular keys and approximately 1 cm×1.5 cm for larger keys (e.g., ENTER key, SHIFT key, and the like). The term approximate means that the keys may be up to 20% larger or up to 20% smaller than 1×1 cm or 1×1.5 cm. The OLED sheet 204 does not interfere with the operation of whatever type of key mechanism is used. The OLED sheet 204 may include the two contact pads 206(1) and 206(2) to provide power to an anode and a cathode of the OLED. The two contact pads 206(1) and 206(2) may be located on the bottom of the OLED sheet 204.

Electrical traces 210 (e.g., 210(1) for the anode and 210(2) for the cathode) may be injection molded or printed on one or more components of the key mechanism to carry power to the OLED sheet 204. For example, the electrical traces 210, located outside the dome 208, inside the dome 208, or partly outside and partly inside, may carry power to the OLED sheet 204.

In a dome-style key mechanism, the dome 208 may run through a hole in the scissor mechanism 212. The scissor mechanism 212 and/or the dome 208 may hold the keycap 202 above the base 214. When a user applies pressure to the keycap 202, the distance between the keycap 202 and the base 214 may decrease. When the distance between the dome 208 and the base 214 is less than a predetermined amount (e.g., 2 mm or less), the keyboard may register a keypress of the key 200.

The base 214 may include the two contacts 216(1) and 216(2) where power (e.g., direct current (DC)) is applied. The power may travel from the contacts 216, along the traces 210, to the pads 206 of the OLED sheet 204. One of the contacts 216 may connect to a cathode of the OLED sheet 204 and another of the contacts 216 may connect to an anode of the OLED sheet 204.

The keycap 202 may include the illustration 218, such as an alphanumeric character or a symbol, that is embedded into the keycap 202. The shape of the OLED sheet 204 may be optimized for each keycap of the keyboard.

Thus, an OLED sheet (e.g., panel) may located below the keycap of each key in a keyboard. The keyboard may use any type of mechanism (e.g., mechanical, capacitive, or the like) to register a key press. Power may be provided to the OLED sheet by running conductive (e.g., metal) traces inside and/or outside the components of each key mechanism. For example, when a dome-style mechanism is used, the conductive traces may run inside or outside the dome. Of course, other techniques, such as running two wires from the base to the OLED sheet, may be used to provide power.

Figure 4A:
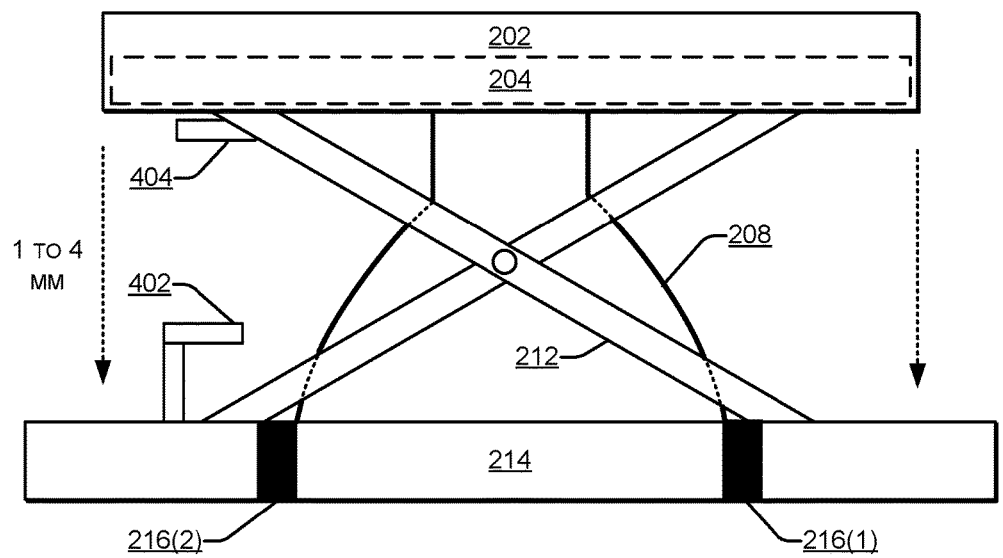
FIG. 4A illustrates a scissor mechanism before a key is pressed, according to some embodiments.

FIG. 4A illustrates a scissor mechanism before a key is pressed according to some embodiments. The OLED sheet 204 may be located just below and inside the keycap 202. The key mechanism illustrated in FIG. 4A shows a first portion 402 of a switch that is part of the base 214 and a second portion 404 of the switch that may be part of the scissor mechanism 404. However, in some embodiments, the second portion 404 of the switch may be part of the dome 208. FIG. 4A shows the scissor mechanism when the keycap 202 is in a normal position in which the key mechanism is not depressed.

Figure 4B:
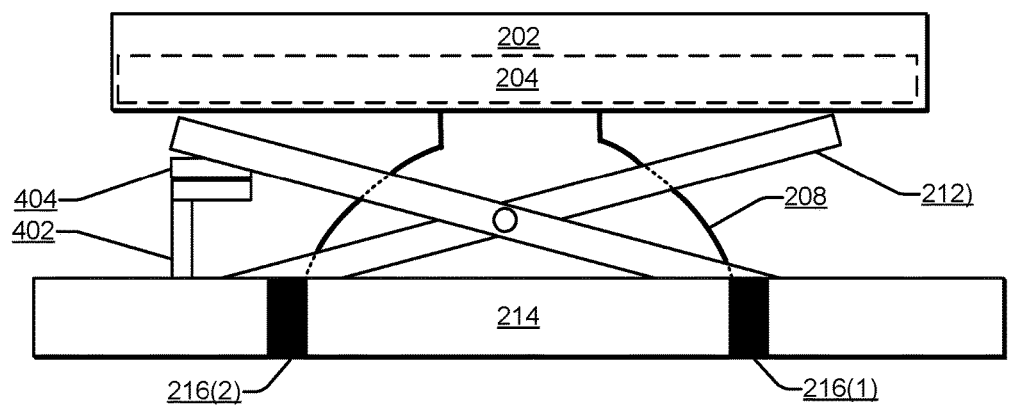
FIG. 4B illustrates the scissor mechanism after the key is pressed, according to some embodiments.

FIG. 4B illustrates the scissor mechanism 212 and dome 208 after the keycap 202 is depressed, causing the second portion 404 to make contact with the first portion 402 of the switch, thereby causing the keyboard 104 to register (e.g., indicate to the computing device 102) a key press. Depending on the implementation, the keycap 202 may travel between 1 millimeter to 4 millimeters when pressure is applied to the keycap 202.

FIG. 5 is a block diagram illustrating an OLED sheet according to some embodiments. For example, the OLED sheet 204 may include several layers, including a top moisture barrier 502, an OLED stack 504, a bottom moisture barrier 506, and plastic (e.g., polyethylene naphthalate or similar) 508. The total width of the OLED sheet 204 may be 0.2 mm or less. The OLED stack 504 may be about 100-200 nanometers (nm) in width.

The moisture barriers 502, 506 may be made of plastic (e.g., polyethylene or the like), polymer-based barrier, atomic layer deposition (ALD), or another type of moisture barrier suitable for OLED. The light emitted by the OLED stack 504 may travel through the bottom moisture barrier 506 and the plastic 508. The plastic 508 may be transparent or translucent to enable the light from the OLED stack 504 to be transmitted through the plastic 508.

FIG. 6 is a block diagram illustrating layers of an OLED stack according to some embodiments. The OLED stack 504 may be between about 100 to about 200 nanometers (nm) in width and may include a cathode (e.g., negative terminal) 602, an electron injection layer 604, a hole blocking layer 606, an emissive layer 608, an electron blocking layer 610, a hole injection layer 612, and an anode (e.g., positive terminal) 614. The cathode 602 may inject electrons into the emissive layer 608. The anode 614 may remove electrons.

Power (e.g., direct current) is provided to the OLED stack 504 via the anode 614 and cathode 602. After power is applied, the cathode 602 receives electrons from the power source and the anode removes them. The added electrons cause the emissive layer 608 to be negatively charged (similar to an n-type layer in a junction diode), while the conductive layers (the layers 610, 612) become positively charged (similar to p-type material). Positive holes jump boundary from the conductive layer (e.g., layers 604, 606) to the emissive layer 608. When a positive hole (a lack of an electron) meets an electron, the two cancel each other out, thereby releasing a brief burst of electromagnetic energy in the form of light (e.g., a photon). This process of a positive hole meeting an electron occurs many times a second, causing the OLED stack 504 to produce light when power is being applied to the cathode 602 and the anode 614.

Figure 7:
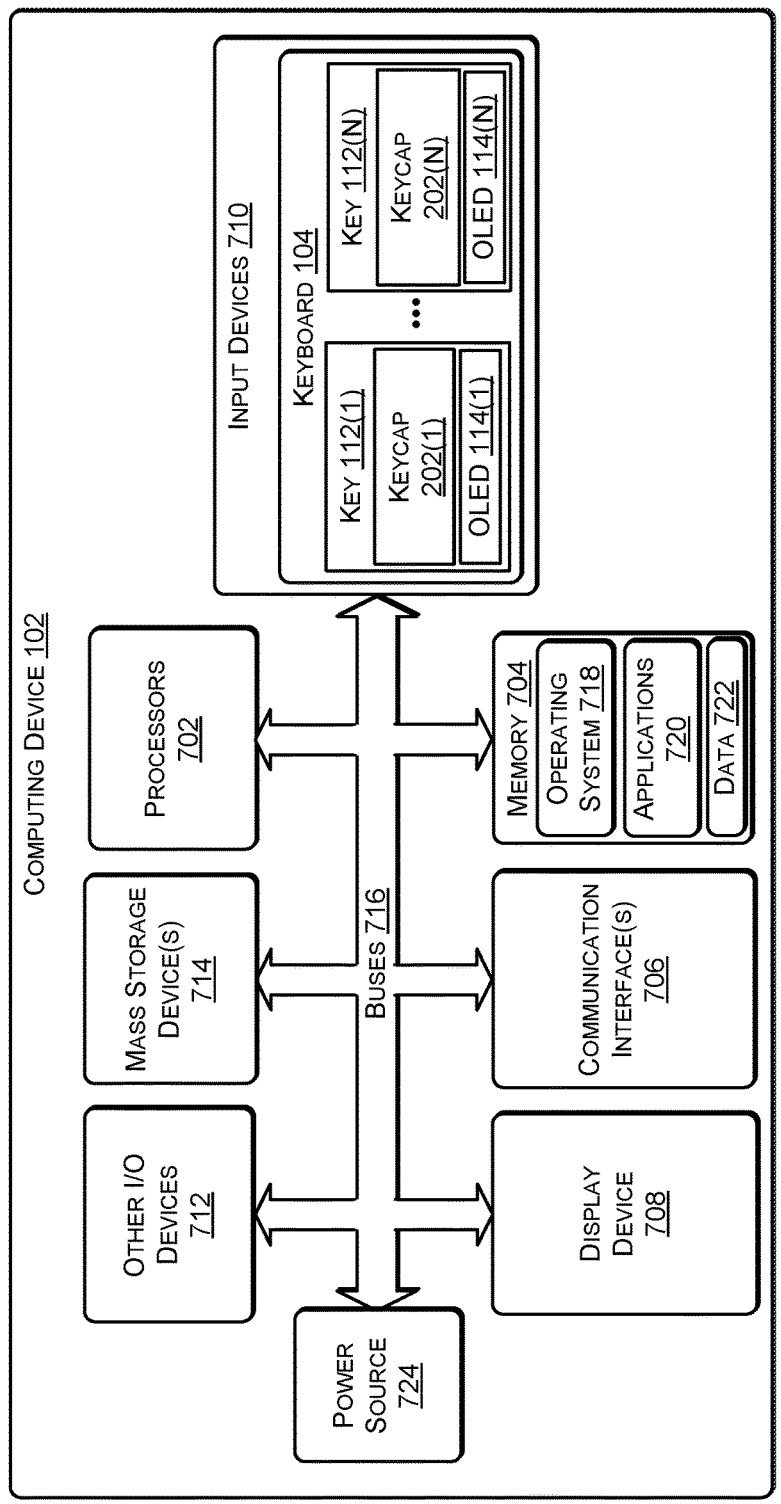
FIG. 7 illustrates an example configuration of a computing device that can be used to implement the systems and techniques described herein.

FIG. 7 illustrates an example configuration of the computing device 102 of FIG. 1 that can be used to implement the systems and techniques described herein. The computing device 102 may include one or more processors 702 (e.g., a central processing unit (CPU), graphics processing unit (GPU), and the like), a memory 704, communication interfaces 706 (e.g., Ethernet, Wi-Fi, and the like), a display device 708, input devices 710 (e.g., the keyboard 104 of FIG. 1), other input/output (I/O) devices 712 (e.g., trackball, and the like), and mass storage devices 714, configured to communicate with each other, such as via one or more system buses 716 or other suitable connections. While a single system bus is illustrated for ease of understanding, it should be understood that the system buses 716 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 702 are one or more hardware devices that may include a single processing unit or a number of processing units, all of which may include single or multiple computing units or multiple cores. The processors 702 may be implemented as one or more microprocessors, microcomputers, microcontrollers, digital signal processors, central processing units, graphics processing units, state machines, logic circuitries, and/or any hardware device that can manipulate signals based on operational instructions. Among other capabilities, the processors 702 may be configured to fetch and execute computer-readable instructions stored in the memory 704, mass storage devices 714, or other computer-readable media.

Memory 704 and mass storage devices 714 are examples of computer storage media (e.g., memory storage devices) for storing instructions that can be executed by the processors 702 to perform the various functions described herein. For example, memory 704 may include both volatile memory and non-volatile memory (e.g., RAM, ROM, or the like) devices. Further, mass storage devices 714 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 714 may be collectively referred to as memory or computer storage media herein, and may be any type of non-transitory media capable of storing computer-readable, processor-executable program instructions as computer program code that can be executed by the processors 702 as a particular machine configured for carrying out the operations and functions described in the implementations herein.

The computing device 102 may also include one or more communication interfaces 706 for exchanging data via a network. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 706 can also provide communication with external storage, such as a storage array, network attached storage, storage area network, cloud storage, or the like.

The computer storage media, such as memory 704 and mass storage devices 714, may be used to store software and data. For example, the computer storage media may be used to store an operating system 718 of the computing device 102 and software applications 720. The memory 704 may also be used to store data 722. A power source 724 may provide power to the various components of the computing device 102 that use power. The power source 724 may be a power supply (e.g., that converts alternating current to direct current), a battery pack, another type of power source, or any combination thereof.

Each of the keys 112 of the keyboard 104 may include a key mechanism, including the OLED sheets 114 placed under the keycaps 202. For example, the first key 112(1) may include the OLED 114(1) below the keycap 202(1) and the Nth key 112(N) may include the OLED 114(N) below the keycap 202(N). The OLED sheets 114 may emit light to illuminate an illustration (e.g., alphanumeric character or symbol) embedded into each of the keycaps 112. In some cases, the OLED sheets 14 may be formed into the shape of the illustration and embedded into each of the keycaps 112. A switch may be used to provide power from the power source 724 to the OLED sheets 114 when the user desires to have the keycaps 202 illuminated and to shut off power from the power source 724 to the OLED sheets 114 when the user powers off the computing device 102 or when the user desires that the keycaps 202 not be illuminated.

Figure 8A:
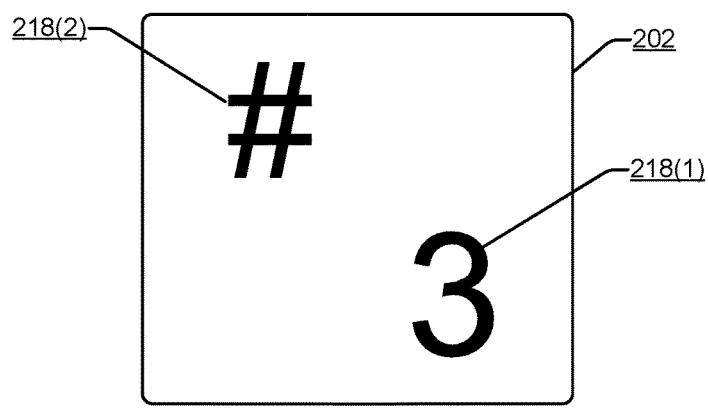
FIG. 8A illustrates two OLED sheets under a keycap of a key according to some embodiments.

FIG. 8A illustrates two OLED sheets under a keycap of a key according to some embodiments. Many keys on a keyboard are multifunction, e.g., pressing the key by itself causes a keypress of a first character or symbol to be registered while pressing the key in conjunction with at least one additional key, such as, for example, a Shift key, a Ctrl (control) key, an Alt (alternate) key, a Fn (function) key, an ESC (escape) key, Windows® key, or the like, may cause a keypress of a second character or symbol to be registered. In this way, a single key may represent multiple characters (e.g., alphabetic characters or numeric characters) or symbols. A key press of one of the multiple characters or symbols is registered based on the key combination that is pressed.

For example, the numeric keys on a keyboard may include a numeral 218(1) embedded on one portion (e.g., the lower part) of the keycap 202 and a symbol 218(2) embedded on another portion (e.g., the upper part) of the keycap 202. In some cases, a first OLED sheet 204(1) may be placed below the numeral 218(1) and a second OLED sheet 204(2) may be placed below the symbol 218(2). Of course, more than two OLED sheets may be used. For example, the number of OLED sheets 204 used under a keycap may vary based on the number of characters or symbols that the key is associated with or the number of characters or symbols embedded 218 into the keycap 202.

Figure 8C:
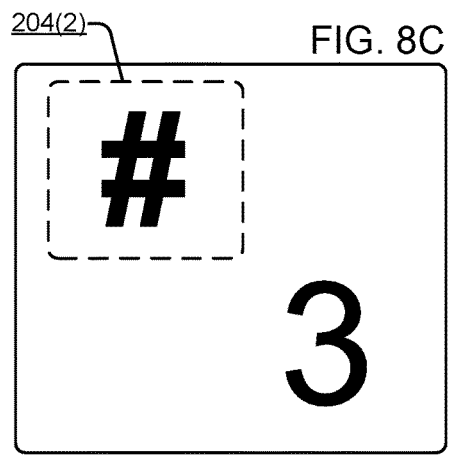
FIG. 8C illustrates illuminating a second of the two OLED sheets according to some embodiments.
Figure 8B:
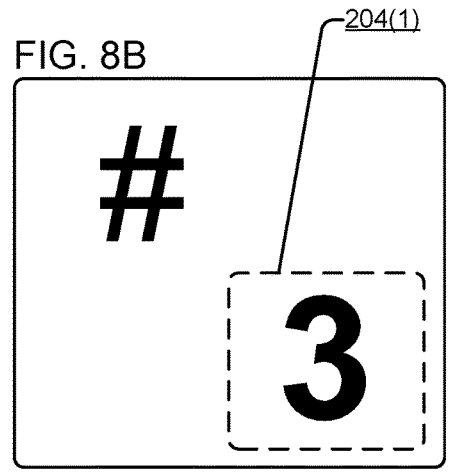
FIG. 8B illustrates illuminating a first of the two OLED sheets according to some embodiments.
Figure 8D:
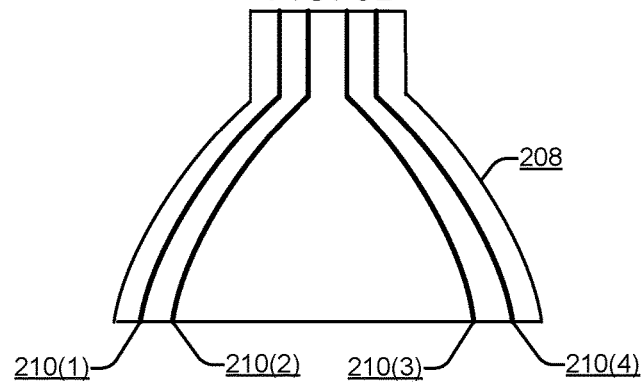
FIG. 8D illustrates components of the keycap.

To provide power to multiple OLED sheets, multiple metal traces (or wires) may run from the base to the top of the key mechanism, such as the dome 208 illustrated in FIG. 8D. For example, in FIG. 8D, for two OLED sheets 204(1) and 204(2), four metal traces (or wires) 210(1), 210(2), 210(3), and 210(4) may run on top of (or inside of) the dome 208 (or other key mechanism). In this example, metal traces 210(1) and 210(2) may provide power to the OLED sheet 204(1) and metal traces 210(3) and 210(4) may provide power to the OLED sheet 204(2). In some cases, only three traces may be used, e.g., two positive and one ground (or negative).

FIG. 8B illustrates a normal (e.g., default) use, in which the first OLED sheet 204(1) may be provided power to illuminate the most common usage of the keycap 202, e.g., the embedded numeral 218(1), while power may not be provided to the OLED sheet 204(2). When the user presses the shift key or the caps lock key, as illustrated in FIG. 8C, power may be provided to the second OLED sheet 204(2), illuminating the embedded symbol 204(2), and power may not be provided to the OLED sheet 204(1). In this way, the OLED sheets 204 may be used to illuminate the usage of each key.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A housing comprising:
   a keyboard having a plurality of keys, wherein an individual key of the plurality of keys comprises:
      a keycap;
      an organic light emitting diode (OLED) sheet having a first pad and a second pad to receive power;
      a dome;
      a first conductive trace running from a top of the dome to a bottom of the dome; and
      a second conductive trace running from the top of the dome to the bottom of the dome.

2. The housing of claim 1, wherein the OLED sheet comprises an emissive layer between a cathode and an anode.

3. The housing of claim 1, wherein a thickness of the OLED sheet is 0.2 millimeters or less.

4. The housing of claim 1, wherein a character or a symbol embedded into the keycap comprises the OLED sheet.

5. The housing of claim 1, wherein a character or a symbol embedded into the keycap comprises a transparent or a translucent material through which light from the OLED sheet passes.

6. The housing of claim 1, wherein the individual key of the plurality of keys further comprises:
   a base;
   a first electrical contact on the base that touches the first conductive trace; and
   a second electrical contact on the base that touches the second conductive trace.

7. The housing of claim 3, wherein applying power to the first and second electrical contacts on the base of the individual key causes the power to flow across the first and second conductive traces to the first and second pad of the OLED sheet, causing the OLED sheet to emit light.

8. A housing comprising:
a keyboard having a plurality of keys;
wherein:
    an individual key of the keyboard comprises one or more organic light emitting diode (OLED) sheets below a corresponding keycap of the individual key;
    the one or more OLED sheets are embedded into the corresponding keycap;
    a shape of each OLED sheet of the one or more OLED sheets comprises a character or a symbol found on a computer keyboard; and
    applying power to the one or more OLED sheets causes the one or more OLED sheets to emit light.

9. The housing of claim 8, further comprising:
one or more processors and one or more storage devices.

10. The housing of claim 8, wherein:
an attachment mechanism of the housing enables a second housing to be attached to the housing for use as a laptop device; and
the attachment mechanism enables the second housing to be detached from the housing to enable the housing to be used as a tablet computing device.

11. The housing of claim 8, wherein:
the housing is separate from and communicatively coupled to a second housing that comprises one or more processors and one or more storage devices.

12. The housing of claim 8, further comprising:
providing power to electrical contacts on a base of the individual key, wherein the power flows across two conductive traces on a portion of a mechanism of the individual key to electrical pads on a particular OLED sheet of the one or more OLED sheets, causing the particular OLED sheet to emit light.

13. The housing of claim 8, wherein the individual key of the keyboard further comprises:
a dome that includes a first conductive trace and a second conductive trace running from a top of the dome to a bottom of the dome.

14. The housing of claim 8, wherein each of the one or more OLED sheets comprises an emissive layer between a cathode and an anode.

15. A device comprising:
a housing comprising:
    a keyboard having a plurality of keys;
    wherein an individual key of the keyboard comprises:
        a keycap;
        an embedded character or an embedded symbol in the keycap;
        an organic light emitting diode (OLED) sheet that comprises the embedded character or the embedded symbol in the keycap; and
        a base.

16. The device of claim 15, wherein the individual key of the keyboard further comprises at least one of:
a scissor mechanism, or
a dome comprising at least one of: a metal or a rubber compound.

17. The device of claim 15, wherein:
a thickness of the OLED sheet is 0.2 millimeters or less.

18. The device of claim 15, wherein the keycap further comprises an embedded character or an embedded symbol made of a material that transmits light emitted by the OLED sheet.

19. The device of claim 15, wherein:
providing power to the base of the individual key, causes the power to travel to the OLED sheet.

20. The device of claim 19, wherein the power travels from the base to the OLED sheet over conductive traces placed on a key mechanism of the individual key.

* * * * *